(12) United States Patent
Dilts et al.

(10) Patent No.: US 11,593,324 B2
(45) Date of Patent: *Feb. 28, 2023

(54) REVERSIBLE DATA TRANSFORMS

(71) Applicant: Lucid Software, Inc., South Jordan, UT (US)

(72) Inventors: Benjamin N. Dilts, Bluffdale, UT (US); Tyler J. Davis, McCammon, ID (US); Sean P. McKenna, Midvale, UT (US)

(73) Assignee: LUCID SOFTWARE, INC., South Jordan, UT (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/495,733

(22) Filed: Oct. 6, 2021

(65) Prior Publication Data

US 2022/0027330 A1 Jan. 27, 2022

Related U.S. Application Data

(63) Continuation of application No. 16/796,757, filed on Feb. 20, 2020, now Pat. No. 11,144,516.

(Continued)

(51) Int. Cl.
*G06F 16/21* (2019.01)
*G06F 16/25* (2019.01)
*G06F 16/26* (2019.01)

(52) U.S. Cl.
CPC .......... *G06F 16/212* (2019.01); *G06F 16/258* (2019.01); *G06F 16/26* (2019.01)

(58) Field of Classification Search
CPC ....... G06F 16/212; G06F 16/26; G06F 16/258

(Continued)

(56) References Cited

U.S. PATENT DOCUMENTS 5,414,809 A  5/1995  Hogan
6,636,250 B1  10/2003  Gasser
(Continued)

FOREIGN PATENT DOCUMENTS

JP  2004-252539 A  9/2004
JP  2006-526840 A  11/2006
(Continued)

OTHER PUBLICATIONS

PCT International Search Report and Written Opinion issued in corresponding application No. PCT/US2020/062438, dated Mar. 23, 2021.

(Continued)

*Primary Examiner* — Dung K Chau
(74) *Attorney, Agent, or Firm* — Maschoff Brennan

(57) ABSTRACT

In an example, a method to generate a visualization of data from a data source based on a contract includes applying a first reversible transform to data of a data source to generate a first intermediate data structure without modifying the data of the data source. The method includes applying a second reversible transform to the first intermediate data structure to generate a second intermediate data structure without modifying the data of the data source. At least one of the first intermediate data structure or the second intermediate data structure is in a format suitable to satisfy a contract. The method includes displaying a visualization of the data of the data source based on the contract satisfied by one or both of the first intermediate data structure or the second intermediate data structure. The displayed visualization has a visualization type specified by the contract.

18 Claims, 12 Drawing Sheets

Related U.S. Application Data

(60) Provisional application No. 62/809,402, filed on Feb. 22, 2019.

(58) Field of Classification Search
USPC .......................................................... 707/694
See application file for complete search history.

(56) References Cited

U.S. PATENT DOCUMENTS

| | | |
|---|---|---|
| 6,982,708 B1 | 1/2006 | Mah et al. |
| 7,149,975 B1 | 12/2006 | Johnson et al. |
| 7,800,613 B2 | 9/2010 | Hanrahan et al. |
| 8,364,820 B2 | 1/2013 | Madani et al. |
| 8,375,068 B1 | 2/2013 | Platt et al. |
| 8,694,906 B2 | 4/2014 | Cole et al. |
| 8,788,931 B1 | 7/2014 | Chen et al. |
| 9,201,558 B1 | 12/2015 | Dingman et al. |
| 9,619,827 B1 | 4/2017 | Joneja |
| 9,633,076 B1 | 4/2017 | Morton |
| 9,684,761 B1 | 6/2017 | Lamant |
| 9,922,108 B1 | 3/2018 | Meiklejohn et al. |
| 10,073,764 B1 * | 9/2018 | Sundermier ............... G06F 8/75 |
| 10,114,884 B1 | 10/2018 | Valensi et al. |
| 10,175,854 B2 | 1/2019 | Ramanathan et al. |
| 10,616,078 B1 | 4/2020 | Thomas |
| 10,684,998 B2 | 6/2020 | Ardila et al. |
| 10,860,603 B2 * | 12/2020 | Dilts ........................ G06F 16/26 |
| 2002/0059183 A1 | 5/2002 | Chen |
| 2004/0168115 A1 | 8/2004 | Bauernschmidt et al. |
| 2005/0179684 A1 | 8/2005 | Wallace |
| 2007/0214179 A1 | 9/2007 | Hoang |
| 2008/0306985 A1 | 12/2008 | Murray et al. |
| 2009/0299920 A1 | 12/2009 | Ferris et al. |
| 2009/0313576 A1 | 12/2009 | Neumann et al. |
| 2010/0005386 A1 | 1/2010 | Verma et al. |
| 2010/0153340 A1 | 6/2010 | Yasrebi |
| 2011/0016099 A1 | 1/2011 | Peer et al. |
| 2011/0055756 A1 | 3/2011 | Chen et al. |
| 2011/0078171 A1 | 3/2011 | Wagenblatt et al. |
| 2011/0109472 A1 | 5/2011 | Spirakis et al. |
| 2011/0179370 A1 | 7/2011 | Cardno et al. |
| 2011/0239164 A1 | 9/2011 | Saraiya et al. |
| 2011/0261049 A1 | 10/2011 | Cardno et al. |
| 2011/0290348 A1 | 12/2011 | Miyazawa et al. |
| 2011/0295865 A1 | 12/2011 | Carroll et al. |
| 2011/0295999 A1 | 12/2011 | Ferris et al. |
| 2012/0011077 A1 * | 1/2012 | Bhagat ............... G06Q 10/0635 |
| | | 705/317 |
| 2012/0226808 A1 | 9/2012 | Morgan |
| 2013/0031143 A1 | 1/2013 | Ktiyar |
| 2013/0097544 A1 | 4/2013 | Parker et al. |
| 2013/0232452 A1 | 9/2013 | Krajec et al. |
| 2013/0304925 A1 | 11/2013 | Ferris et al. |
| 2014/0006421 A1 | 1/2014 | Van Ham |
| 2014/0071138 A1 | 3/2014 | Gibson et al. |
| 2014/0181718 A1 | 6/2014 | Gao et al. |
| 2014/0195515 A1 | 7/2014 | Baker et al. |
| 2014/0208215 A1 | 7/2014 | Deshpande |
| 2014/0244627 A1 | 8/2014 | Bhatia |
| 2014/0258446 A1 | 9/2014 | Bursell |
| 2014/0278808 A1 | 9/2014 | Lyoob et al. |
| 2014/0324710 A1 | 10/2014 | Thibout et al. |
| 2014/0365655 A1 | 12/2014 | Takahashi et al. |
| 2015/0019301 A1 | 1/2015 | Jung et al. |
| 2015/0019569 A1 | 1/2015 | Parker et al. |
| 2015/0294488 A1 | 10/2015 | Iwasaki et al. |
| 2015/0312421 A1 | 10/2015 | Leemet et al. |
| 2015/0339379 A1 | 11/2015 | Inagaki |
| 2015/0365299 A1 | 12/2015 | Schaerges et al. |
| 2016/0034835 A1 | 2/2016 | Levi et al. |
| 2016/0042252 A1 | 2/2016 | Sawhney et al. |
| 2016/0042253 A1 | 2/2016 | Sawhney et al. |
| 2016/0070451 A1 | 3/2016 | Kim et al. |
| 2016/0070541 A1 | 3/2016 | Lee |
| 2016/0098848 A1 * | 4/2016 | Zamanakos ............ A61B 5/7275 |
| | | 345/440 |
| 2016/0112277 A1 | 4/2016 | Nagarajan et al. |
| 2016/0162598 A1 | 6/2016 | Schaerges et al. |
| 2016/0371312 A1 | 12/2016 | Ben-Aharon et al. |
| 2017/0031958 A1 | 2/2017 | Miller |
| 2017/0039576 A1 * | 2/2017 | Gauthier ............. G06Q 30/0201 |
| 2017/0132300 A1 | 5/2017 | Sekar |
| 2017/0228447 A1 | 8/2017 | Catania et al. |
| 2017/0293415 A1 | 10/2017 | Mackinlay et al. |
| 2017/0351753 A1 | 12/2017 | Duncker et al. |
| 2018/0039657 A1 | 2/2018 | Pandit |
| 2018/0067998 A1 | 3/2018 | Sherman et al. |
| 2018/0091579 A1 | 3/2018 | Thomas |
| 2018/0121482 A1 | 5/2018 | Heen et al. |
| 2018/0150436 A2 | 5/2018 | Ben-Aharon et al. |
| 2018/0173790 A1 | 6/2018 | Krishnamacharya |
| 2018/0189330 A1 | 7/2018 | Doan et al. |
| 2018/0196863 A1 | 7/2018 | Meiklejohn et al. |
| 2018/0232340 A1 | 8/2018 | Lee |
| 2018/0337794 A1 | 11/2018 | Casaletto et al. |
| 2019/0012736 A1 | 1/2019 | Courbage et al. |
| 2019/0018904 A1 | 1/2019 | Russell et al. |
| 2019/0129968 A1 | 5/2019 | Neylan et al. |
| 2019/0213099 A1 | 7/2019 | Schmidt et al. |
| 2019/0286620 A1 | 9/2019 | Al-Haimi et al. |
| 2019/0294473 A1 | 9/2019 | Martin et al. |
| 2019/0340038 A1 | 11/2019 | Molloy et al. |
| 2019/0384836 A1 | 12/2019 | Roth et al. |
| 2020/0004865 A1 | 1/2020 | Dilts et al. |
| 2020/0004866 A1 | 1/2020 | Dilts et al. |
| 2020/0004872 A1 | 1/2020 | Dilts et al. |
| 2020/0272608 A1 | 8/2020 | Dilts et al. |

FOREIGN PATENT DOCUMENTS

| | | |
|---|---|---|
| JP | 2016-085761 A | 5/2016 |
| KR | 10-2015-0031502 | 3/2015 |
| WO | 2012-118726 A2 | 9/2012 |
| WO | 2018/145112 | 8/2014 |

OTHER PUBLICATIONS

PCT International Search Report and Written Opinion issued in corresponding application No. PCT/US2020/062437, dated Mar. 19, 2021.

Notice of Allowance issued in corresponding U.S. Appl. No. 16/024,533, dated Oct. 20, 2020.

Notice of Allowance issued in corresponding U.S. Appl. No. 16/024,544, dated Sep. 30, 2020.

Office Action issued in corresponding U.S. Appl. No. 16/445,040, dated Feb. 19, 2021.

Office Action issued in corresponding U.S. Appl. No. 16/697,004, dated Oct. 26, 2020.

Office Action issued in corresponding U.S. Appl. No. 16/696,998, dated Feb. 8, 2021.

Office Action issued in corresponding U.S. Appl. No. 16/024,551, dated Jan. 14, 2021.

PCT International Search Report and Written Opinion issued in corresponding application No. PCT/US2020/018343, dated Jun. 23, 2020.

International Search Report and Written Opinion issued in PCT Application No. PCT/US2020/036239, dated Sep. 11, 2020.

Office Action issued in U.S. Appl. No. 16/697,004, dated May 7, 2020.

Office Action issued in U.S. Appl. No. 16/024,544, dated Jun. 23, 2020.

Office Action issued in U.S. Appl. No. 16/024,533, dated Jul. 2, 2020.

Office Action issued in U.S. Appl. No. 16/024,551, dated Aug. 10, 2020.

Final Office Action issued in corresponding U.S. Appl. No. 16/024,551, dated May 12, 2021.

Notice of Allowance issued in corresponding U.S. Appl. No. 16/445,040, dated May 27, 2021.

(56) References Cited

OTHER PUBLICATIONS

Non-Final Office Action issued in corresponding U.S. Appl. No. 16/697,004, dated Mar. 31, 2021.
PCT/US2018/017105 International Search Report and Written Opinion, dated Apr. 6, 2018 (22 pgs).
International Search Report and Written Opinion issued in PCT Application No. PCT/US2019/040001, dated Oct. 24, 2019.
International Search Report and Written Opinion issued in PCT Application No. PCT/US2019/040004, dated Oct. 24, 2019.
International Search Report and Written Opinion issued in PCT Application No. PCT/US2019/040006, dated Oct. 24, 2019.
Office Action issued in U.S. Appl. No. 16/024,533, filed Mar. 18, 2020.
Office Action issued in U.S. Appl. No. 16/024,551, filed Apr. 2, 2020.
How to Use ViewModel in Asp. Net MVC with Example, by Tutlane, archived on Archive.org on Oct. 26, 2017. https://web.archive.org/web/20171026085504/https://www.tutlane.conn/tutorial/aspnet-nnvc/how-to-use-viewnnodel-in-asp-net-nnvc-with-example. (Year: 2017).
Single ASP.net MVC application using multiple databases, by Adriano Silva, StackOverflow, Mar. 22, 2012, https://stackoverflow.conn/questions/9823330/single-asp-net-nnvc-application-using-multiple-databases. (Year: 2012).
Refresh table using AJAX in ASP.net MVC, by Voila Daniel, StackOverflow, Jul. 28, 2016, https://stackoverflow.com/questions/38635966/refresh-table-using-ajax-in-asp-net-mvc. (Year: 2016).
Upload and Read CSV File in ASP.Net MVC, by TechBrij, Jan. 17, 2015, https://techbrij.com/read-csv-asp-net-mvc-file-upload. (Year: 2015).
Anonymous, "Instead of Update Triggers and View", Feb. 16, 2018, pp. 1-9.
European Search Report issued in corresponding application No. 20760262.4, dated Sep. 22, 2022.

* cited by examiner

REVERSIBLE DATA TRANSFORMS

CROSS-REFERENCE TO RELATED APPLICATION

This application is a continuation of U.S. patent application Ser. No. 16/796,757 filed on Feb. 20, 2020 which claims the benefit of and priority to U.S. Provisional Patent Application No. 62/809,402 filed on Feb. 22, 2019. The Ser. No. 16/796,757 application and the Ser. No. 62/809,402 application is each incorporated herein by reference.

FIELD

The embodiments discussed herein are related to reversible data transforms.

BACKGROUND

Unless otherwise indicated herein, the materials described herein are not prior art to the claims in the present application and are not admitted to be prior art by inclusion in this section.

Some structured source data, e.g., of networks, organizations, or other structured source data, lends itself to representation in the form of a diagram or other visualization, such as a network diagram or an organizational chart. Some diagram applications allow users to generate visualizations on a computer based on the structured source data. For example, a user may manually create from the structured source data a diagram that depicts data objects and their relationships, e.g., by manually creating in a graphical drawing canvas graphical objects that represent the data objects and their relationships.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to reversible data transforms.

In an example embodiment, a non-transitory computer-readable storage medium has computer-executable instructions stored thereon that are executable by a processor device to perform or control performance of operations. The operations include mapping at least some data of a data source to a contract such that the contract is satisfied, including applying a first reversible transform and a second reversible transform. The first reversible transform is applied to at least some of the data of the data source to generate a first intermediate data structure without modifying the at least some of the data of the data source. The second reversible transform is applied to the first intermediate data structure to generate a second intermediate data structure without modifying the at least some of the data of the data source. At least one of the first intermediate data structure or the second intermediate data structure is in a format suitable to satisfy the contract. The method includes displaying a visualization of the at least some data of the data source based on the contract, the displayed visualization having a visualization type specified by the contract.

In another example embodiment, a method to generate a visualization of data from a data source based on a contract includes applying a first reversible transform to data of a data source to generate a first intermediate data structure without modifying the data of the data source. The method includes applying a second reversible transform to the first intermediate data structure to generate a second intermediate data structure without modifying the data of the data source. At least one of the first intermediate data structure or the second intermediate data structure is in a format suitable to satisfy a contract. The method includes displaying a visualization of the data of the data source based on the contract satisfied by one or both of the first intermediate data structure or the second intermediate data structure. The displayed visualization has a visualization type specified by the contract.

In another example embodiment, a non-transitory computer-readable storage medium has computer-executable instructions stored thereon that are executable by a processor device to perform or control performance of operations. The operations include applying a first reversible transform to data of a data source to generate a first intermediate data structure without modifying the data of the data source. The operations include applying a second reversible transform to the first intermediate data structure to generate a second intermediate data structure without modifying the data of the data source. At least one of the first intermediate data structure or the second intermediate data structure is in a format suitable to satisfy a contract. The operations include displaying a visualization of the data of the data source based on the contract satisfied by one or both of the first intermediate data structure or the second intermediate data structure. The displayed visualization has a visualization type specified by the contract.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

U.S. patent application Ser. No. 16/024,533 (the '533 application) titled AUTOLAYOUT OF VISUALIZATIONS BASED ON CONTRACT MAPS and filed Jun. 29, 2018 is incorporated herein by reference in its entirety.

The '533 application discloses, among other things, using structured source data to automatically generate visualizations, such as org charts or containers, of data objects represented in the structured source data. The '533 application also discloses at a high level that updates made to the visualizations, e.g., to graphical objects within the visualizations that represent the data objects, may be propagated back to the source data in some circumstances.

It may be desirable to maintain source data in its original format to, e.g., maintain compatibility of the source data with its source. However, the source data may not be suitable as is for automatically generating visualizations. Accordingly, some embodiments described herein may involve generating one or more intermediate data structures by applying one or more transforms to the source data and/or to a given one of the intermediate data structures. Each of the intermediate data structures may include or embody a forward and a backward transform rule. As such, the intermediate data structures may effectively transform the source data, without actually altering the source data, into a format suitable to automatically generate visualizations when functioning as forward transform rules, while also permitting edits to the visualization to be written back into the source data when functioning as backward transform rules.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Figure 1:
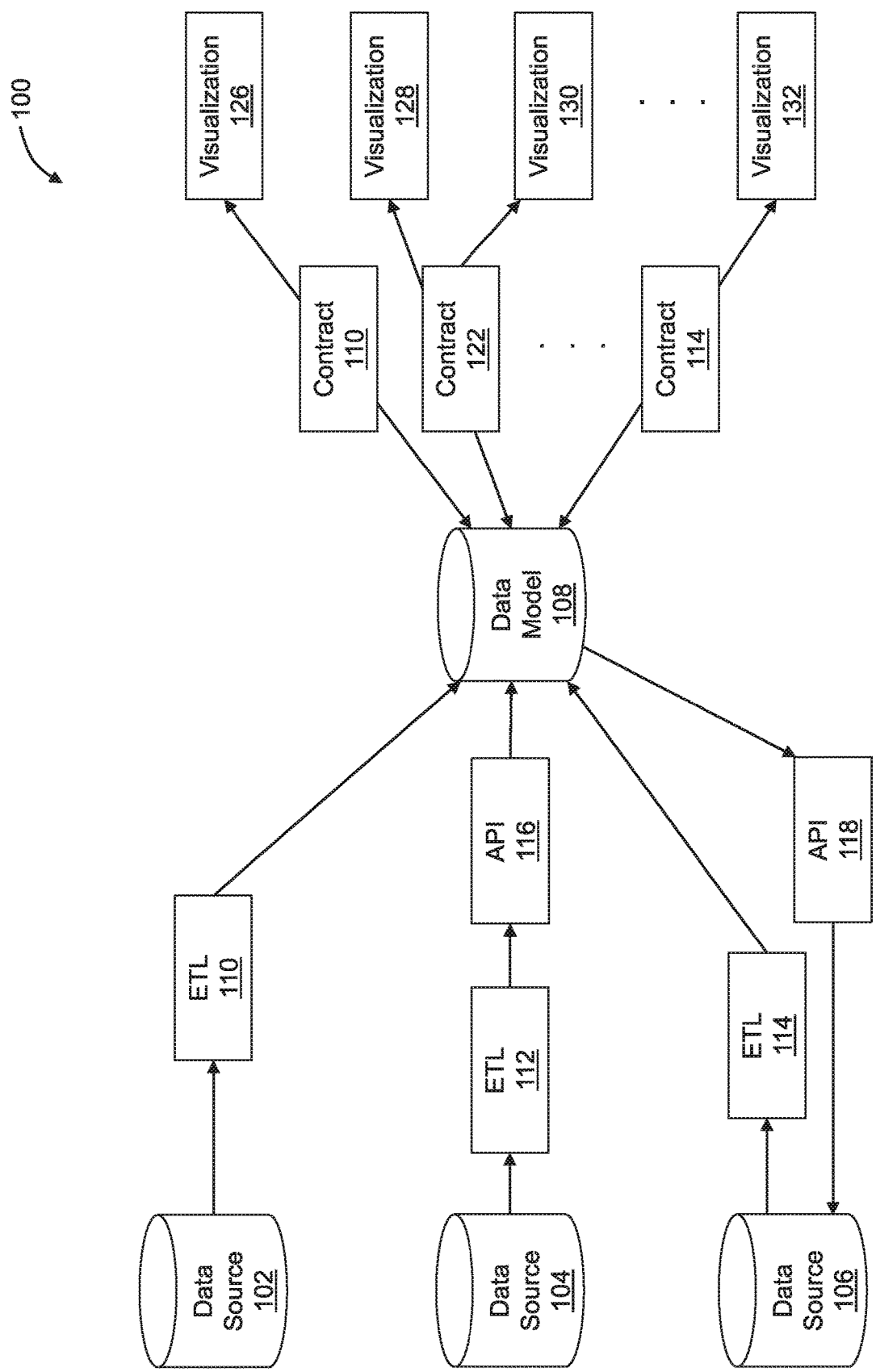
FIG. 1 is a block diagram of an example architecture to implement reversible data transforms.

FIG. 1 is a block diagram of an example architecture 100 to implement reversible data transforms, arranged in accordance with at least one embodiment described herein. The architecture 100 may include one or more data sources 102, 104, 106 and a data model 108.

Each of the data sources 102, 104, 106 may include one or more collections of data, referred to as data collections. The data collections may be data collections of a corresponding entity, such as a business, a company, an agency, a municipality, an individual and/or other entity. In an example, the data source 102 and/or one or more data collections thereon may be owned by or otherwise associated with one entity, the data source 104 and/or one or more data collections thereon may be owned by or otherwise associated with another entity, and the data source 106 and/or one or more data collections thereon may be owned by or otherwise associated with still another entity. Alternatively or additionally, two or more data sources may be owned by or otherwise associated with the same entity.

Each of the data sources 102, 104, 106 and/or the data collections may include, for example, a human resources (HR) system or database such as BAMBOOHR or WORKDAY; a customer relationship management (CRM) system such as SALESFORCE.COM or MICROSOFT DYNAMICS CRM; a spreadsheet for HR, e.g., with names, pictures, and/or a reporting structure for employees of an entity; a custom internal logging system; a floorplan database (e.g., with employee office/workstation assignments); a cloud infrastructure provider such as AWS, GOOGLE CLOUD, or MICROSOFT AZURE; a database schema (e.g., to generate Entity Relationship Diagrams); a service-oriented architecture; physical network discovery tools; custom-built technical systems that can be modeled similar to a network; or other suitable data source and/or data collection. The data in each of the data sources 102, 104, 106 and/or the data collections may have a specific format, which may be different and/or the same from one data source 102, 104, 106 to another and/or from one data collection to another. Some example data formats include proprietary formats, Structured Query Language (SQL), and JavaScript Object Notation (JSON).

To allow the same or similar operations (e.g., generation of visualizations) to be performed on data from different ones of the data sources 102, 104, 106, from different data collections, and/or with different data formats at the data sources 102, 104, 106, the data from the data sources 102, 104, 106 may be standardized before being saved in the data model 108. Accordingly, the architecture 100 may include one or more ETL modules 110, 112, 114 to translate data of the data sources 102, 104, 106 from a first format (e.g., proprietary, SQL, JSON, or other data format) to a standardized format in which the data is saved on the data model 108. Alternatively or additionally, the data of the data sources 102, 104, 106 may be transformed into one or more in-memory intermediate data structures that are not permanently saved.

A service provider that provides and/or supports the data model 108 and/or provides various operations (e.g., generation of visualizations) that can be done on data in the data model 108 may provide the ETL module 110 to translate data of the data source 102 from one or more non-standardized formats to a standardized format that is standardized for the data model 108 and the operations provided by the service provider. Alternatively or additionally, the service provider may provide an application programming interface 116 that permits the entity associated with the data source 104 or some other entity the ability to generate a proprietary ETL module, e.g., the ETL module 112, to translate data of the data source 104 from one or more non-standardized formats to the standardized format. Alternatively or additionally, the ETL module 114, whether provided by the service provider or a different entity, may translate data of the data source 106 from one or more non-standardized formats to the standardized format, while an API 118 may allow the service provider to update source data of the data source 106 responsive to, e.g., a change made to a visualization of at least some of the source data of the data source 106.

With continued reference to FIG. 1, the architecture 100 may further include one or more contracts 120, 122, 124 to generate one or more visualizations 126, 128, 130, 132 of data from the data sources 102, 104, 106. Each of the contracts 120, 122, 124 and other contracts described herein may specify a structure of data necessary to produce one or more visualizations, such as the visualizations 126, 128, 130, 132.

Each of the visualizations 126, 128, 130, 132 may have a visualization type associated with the corresponding contract 120, 122, 124. For example, generating a visualization of a specific visualization type may require a specific contract that specifies the structure of data necessary to produce the visualization with the specific visualization type. In some cases, multiple visualization types may be associated with the same contract. For example, generating a visualization with any of two or more specific visualization types may require the same specific contract that specifies the structure of data necessary to produce the visualization with either of the two or more specific visualization types. For example, the visualization 128 may have one visualization type that is associated with the contract 122, while the visualization 130 may have a different visualization type that is also associated with the contract 122. In other cases, some contracts may each be associated with only a single visualization type.

Figure 2:
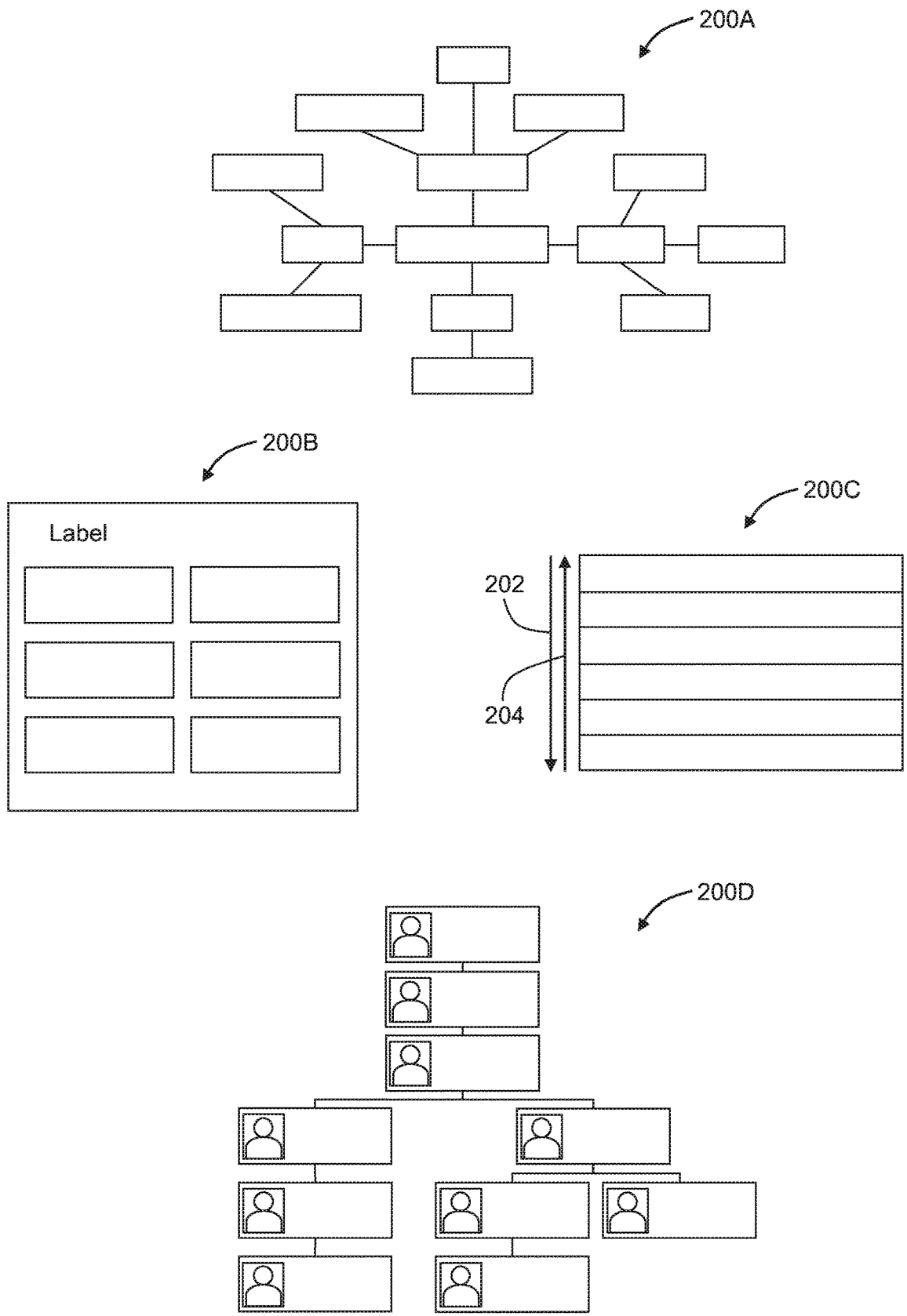
FIG. 2 illustrates various example visualizations with various example visualization types.

FIG. 2 illustrates various example visualizations 200A, 200B, 200C, 200D (hereinafter collectively "visualizations 200") with various example visualization types, arranged in accordance with at least one embodiment described herein. The visualization 200A has a mind map visualization type that organizes information in a hierarchical manner to show relationships among pieces of a whole. The visualization 200B has a container visualization type in which different objects that have a same feature are depicted within a same group or container. The visualization 200C has an abstraction layers visualization type that may, e.g., generalize conceptual models or algorithms with increasing order of complexity in one direction and increasing order of abstraction in the other direction, as indicated by the arrows 202, 204. The visualization 200D has a hierarchical organizational chart visualization type that shows the structure of an organization and the relationships and relative ranks of its parts and positions/jobs, where every entity in the organization, except one in this example, is subordinate to a single other entity. More generally, the visualizations that may be generated according to embodiments described herein may have any suitable visualization type, such as organizational chart (e.g., hierarchical organizational chart, matrix organizational chart, flat organizational chart), container, mind map, abstraction layer, logical network diagram, flowchart, supply chain process map, concept map, or other suitable visualization type.

Returning to FIG. 1, each of the contracts 120, 122, 124 and other contracts described herein may include one or more corresponding schema that describe a corresponding set of and corresponding type of fields required to satisfy the corresponding contract 120, 122, 124. Alternatively or additionally, each schema may specify a set of one or more data fields corresponding to specific data from a corresponding one of the data sources 102, 104, 106, e.g., in a standardized format in the data model 108, and one or more relationships between data fields in the set. Each schema may be casually referred to as a shape of underlying source data. E.g., data of a corresponding one of the data sources 102, 104, 106 that satisfies a particular schema, or has a particular "shape", may be used to generate a visualization having the visualization type described by the particular schema.

To generate a corresponding one of the visualizations 126, 128, 130, 132 of data from a given one of the data sources 102, 104, 106, a user may select a visualization type that is associated with a given one of the contracts 120, 122, 124 to apply to the visualization 126, 128, 130, 132. At least some data from the corresponding one of the data sources 102, 104, 106, e.g., in the standardized format in the data model 108, may then be mapped to the associated one of the contracts 120, 122, 124 such that the contract 120, 122, 124 and/or the corresponding schema is satisfied. In at least one embodiment, the contract 120, 122, 124 may be considered satisfied if the mapping identifies specific data from the data source 102, 104, 106 that satisfies and/or is compatible with the set of data fields and relationships of the schema of the contract 120, 122, 124.

After the mapping, the corresponding one of the visualizations 126, 128, 130, 132 may then be displayed based on the corresponding contract 120, 122, 124, where the displayed visualization 126, 128, 130, 132 has the selected visualization type.

Figure 3:
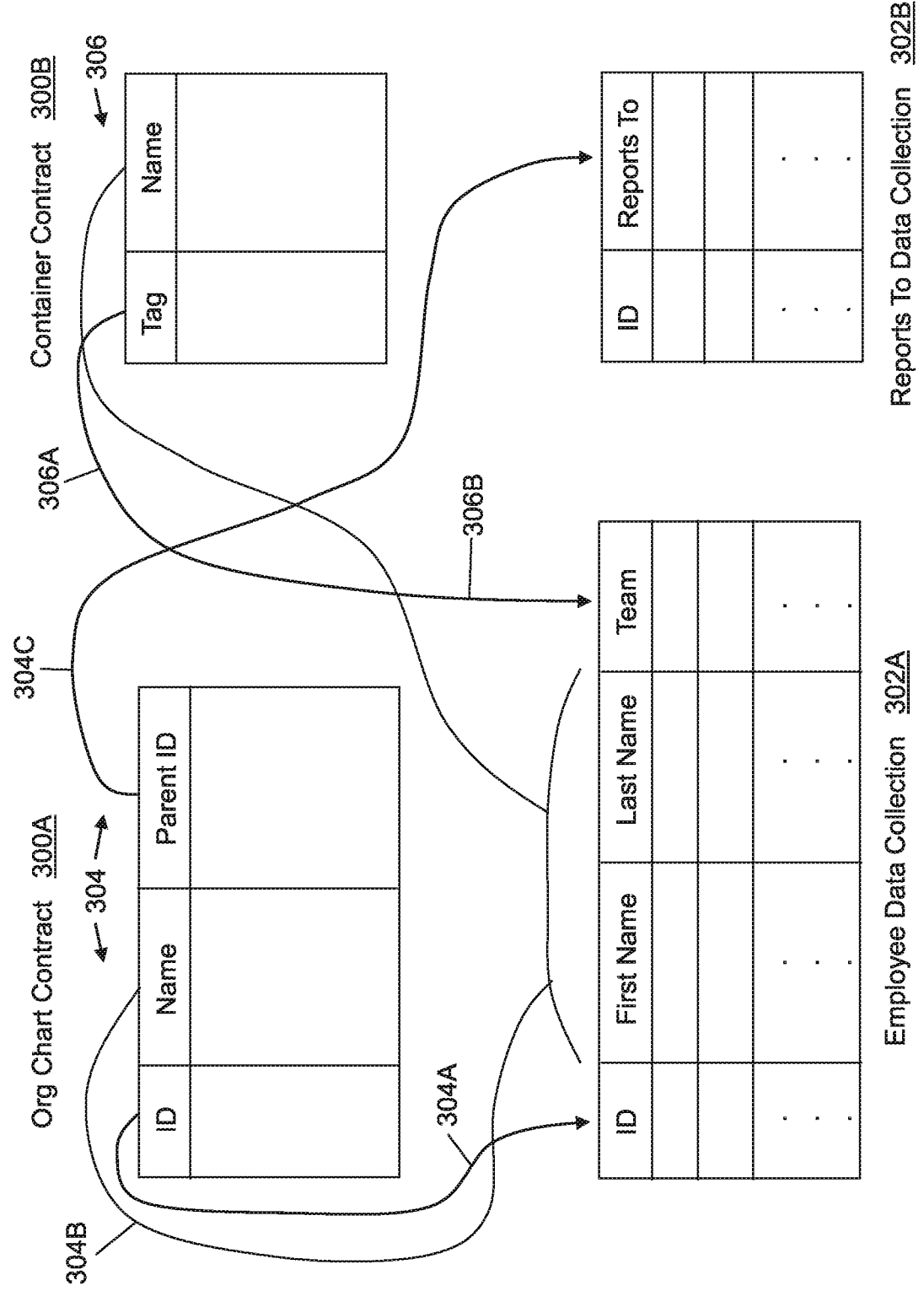
FIG. 3 illustrates two example contracts and example data collections from a data source.

FIG. 3 illustrates two example contracts 300A, 300B (collectively "contracts 300") and example data collections 302A, 302B (collectively "data collections 302") from a data source, arranged in accordance with at least one embodiment described herein.

The contract 300A may be or include a simple organizational chart contract to generate visualizations with an organizational chart visualization type, such as one or more of hierarchical organizational chart, matrix organizational chart, or flat organizational chart. The contract 300A includes a schema that defines three data fields—ID, Name, and Parent ID—that have a specified relationship in which the ID, Name, and Parent ID are associated with a specific entity (e.g., an employee that has an ID and a Name and that reports to another entity (e.g., a manager or supervisor) identified by the Parent ID) as a data object to be represented in the visualization, where the Parent ID for one data object is the ID for another data object. The contract 300A may permit one or a few data objects, e.g., corresponding to one or more owners, executives, or other entities of an organization that are at a top of a hierarchy of the organization and that do not report to anyone else, to not have a Parent ID.

In at least one embodiment, a contract such as the contract 300A, and/or a schema included in the contract, may include one or more optional data fields and/or relationships to describe more unusual relationships. For example, some employees may report to multiple managers or supervisors and the contract 300A may have two or more "Parent ID" fields instead of one, where one of the "Parent ID" fields is required and one or more other "Parent ID" fields are optional.

In some embodiments, an organizational chart contract may be more complex or different than the contract 300A of FIG. 3, e.g., may include more, fewer, and/or different data fields than illustrated in FIG. 3. For example, such organization chart contracts may include an employee photo Uniform Resource Identifier (URI) data field, an office location data field, and/or other data fields.

The contract 300B may be or include a container contract to generate visualizations with a container visualization type. The contract 300B includes a schema that defines two data fields—Tag and Name—that have a specific relationship in which the Tag and Name are associated with a specific entity (e.g., an employee that has a Name and that is on a specific team within an organization where the team is designated by a Tag) as a data object to be represented in the visualization, where one or more multiple data objects may have the same Tag. In some embodiments, a container contract may be more complex or different than the contract 300B of FIG. 3, e.g., may include more, fewer, and/or different data fields than illustrated in FIG. 3.

The data collection 302A may include an employee data collection that includes employee IDs, First Names, Last Names, and Team designations for each employee of an organization. The data collection 302A may include data from a data source, e.g., an HR database, and/or the data may be in a standardized, tabular format, e.g., in the data model 108 of FIG. 1.

The data collection 302B may include a reports to data collection that includes employee IDs for the employees and an identification of, e.g., a manager, a supervisor, or other individual in the organization each employee reports to. The identification of the manager, supervisor, or other individual in the organization that each employee reports to may include the manager's or supervisor's employee ID in an example embodiment, or other identifying information for the manager or supervisor. The data collection 302B may include data from a data source, e.g., a spreadsheet that identifies each employee and each employee's supervisor, and/or the data may be in a standardized, tabular format, e.g., in the data model 108 of FIG. 1.

FIG. 3 additionally illustrates contract maps 304, 306 to map data from the data collections 302 to the contracts 300. Each contract map 304, 306 may include one or more pointers to data of a data source, e.g., to data of one or both of the data collections 302 in these examples. In particular, the contract map 304 includes pointers 304A, 304B, and 304C and the contract map 306 includes pointers 306A, 306B. The pointers 304A, 304B, 304C, 306A, 306B point to the appropriate data of the data source(s) 302 to satisfy the corresponding contract 300.

For example, the pointer 304A of the contract map 304 specifies that data for the ID data field in the contract 300A is in the ID field of the data collection 302A. The pointer 304B of the contract map 304 specifies that data for the Name data field in the contract 300A is a concatenation of the data in the First Name field and the Last Name field of the data collection 302A. The pointer 304C of the contract map 304 specifies that data for the Parent ID data field in the contract 300A is in the Reports To field of the data collection 302B.

Analogously, the pointer 306A of the contract map 306 specifies that data for the Tag data field in the contract 300B is in the Team field of the data collection 302A. The pointer 306B of the contract map 306 specifies that data for the Name data field in the contract 300B is a concatenation of the data in the First Name field and the Last Name field of the data collection 302A.

Accordingly, the data source that includes the data collections 302 may include one or more data objects. Each visualization may graphically represent one or more of the data objects using one or more graphical objects. In particular, each data object may be represented by or otherwise associated with a set of one or multiple graphical objects. For example, a data object of an employee or other individual in an organization may be graphically represented by a box or other shape outline (e.g., a first graphical object), a photo of the employee (e.g., a second graphical object), text (e.g., a third graphical object) that may include the employee's name, office location, and/or other information, and/or a connector (e.g., a fourth graphical object) that indicates the employee's supervisor or manager or other individual the employee reports to.

Alternatively or additionally, in at least one embodiment, one graphical object may represent multiple data objects. For example, some portions of an organizational chart or other visualization may be selectively collapsed, in which case multiple employees (e.g., multiple data objects) may be hidden and may instead be represented by a suitable graphical object. As another example, an entire team of multiple employees may be represented by a single shape for the team.

Each visualization described herein may be generated based on a contract, e.g., the contracts 300, from a semantic layout and a concrete layout. The semantic layout may be generated based on a corresponding contract, such as the contracts 300, and may specify one or more of relative locations, arrangement, and relationship of multiple data objects to represent in a visualization. The concrete layout may specify a set of one or more graphical objects to display for each of the data objects to be represented in the visualization. In some embodiments, the concrete layout may specify a default set of one or more graphical objects for each of the data objects. Alternatively or additionally, the concrete layout may specify a custom set of one or more graphical objects for a subset of the data objects. In at least one embodiment, the custom set of one or more graphical objects may be specified in the concrete layout responsive to receiving input, e.g., from a user, effective to alter the default set to the custom set for the subset of the data objects. The customization may be provided for individual data objects and/or for classes or groups of data objects by using conditional customization.

The custom set of one or more graphical objects may be customized and different in at least one respect compared to the default set of one or more graphical objects, although there may be some overlap between the custom set and the default set. For example, the default set of one or more graphical objects may include an outline with a specific shape, color, line type (e.g., solid, dashed, dot-dash, etc.), and line weight and text of a specific font, size, and color. In comparison, at least one of the foregoing outline shape, outline color, outline line type, outline line weight, text font, text size, and/or text color may be different for the custom set of one or more graphical objects.

In some examples, graphical objects in the visualization that represent data objects may be altered, e.g., by a user. The alterations to the graphical objects may implicate changes to the data objects. For example, in a visualization with an organizational chart visualization type, if a connector or other graphical object that connects an employee to the employee's manager or supervisor is modified to connect the employee to a different manager, supervisor, or other entity, this may indicate that the user desires to change the employee's manager or supervisor. As another example, in a visualization with a container chart visualization type, assume containers represent different groups or teams, with different boxes or text within each container representing members of the corresponding group or team; if a box or text representing a specific member of one group or team is moved by a user from a first container of a first group or team to a different second container of a second group or team, this may indicate the user desires to change the specific member from being on the first group or team to being on the second group or team. As still another example, in a visualization with a logical network diagram visualization type, if a connector between a port of a first device and a first port of a second device is altered to connect the port of the first device to a second port of the second device or to a port of a third device, this may indicate the user desires to change the port(s) over which the first and second devices communicate and/or which devices communicate with each other.

At least one embodiment described herein includes updating the underlying source data to reflect changes made to visualizations. In the examples provided above, for instance, source data may be updated by, e.g., changing an employee's manager or supervisor at a corresponding data source, changing an employee or other entity's membership in a group or team at the data source, and/or changing the ports over which and/or the devices with which a device communicates at the data source. Changes to the underlying data may be implemented automatically in response to alteration of the visualization, or after querying the user about whether to change the underlying data and receiving an affirmative response to the query. The user may be queried about whether to update the underlying data every time an alteration is made, or in batches, e.g., periodically or when the user closes the visualization after making a set of one or more alterations.

FIG. 3 illustrates one type of reversible data transform that may be implemented, e.g., by a contract, according to some embodiments described herein. In particular, the "First Name" and "Last Name" fields from the employee data collection 302A are concatenated and renamed (e.g., transformed) to the "Name" field in each of the contracts 300A and 300B. Similarly, the "Reports To" field from the reports to data collection 302B is renamed to the "Parent ID" field in the contract 300A, while the "Team" field from the employee data collection is renamed to the "Tag" field in the contract 300B.

Consider the following example of the reversible nature of the renaming transform that allows the source data, e.g., the employee data collection 302A, to be written to (and thus updated) when a corresponding visualization is updated. Suppose a user moves an employee (or more particularly, a graphical object representing the employee) in a container visualization generated by the contract 300B from one container (e.g., associated with one team) to a different container (e.g., associated with a different team). Such a move may be effected by changing the tag (in the contract 300B) associated with the name (in the contract 300B) of the employee from the tag corresponding to one team to the tag corresponding to the other team but the move from one container to the other does not directly update the tag in the contract. In particular, the pointer 306A points upstream to the "Team" field of the employee data collection 302A. Thus, if the employee is moved from one team to another, this may be updated in the source data by a command to change the tag in the contract 300B from one team to the other, which does not actually change the tag and instead follows the pointer 306A upstream to the employee data collection 302A (e.g., the source data) where the team is changed from one team to the other. Thereafter, in the forward direction, because the contract 300B points to the updated employee data collection 302A, the tag for the employee is updated in the contract 300B and the employee will be displayed in the correct/updated container in the visualization.

Figure 4:
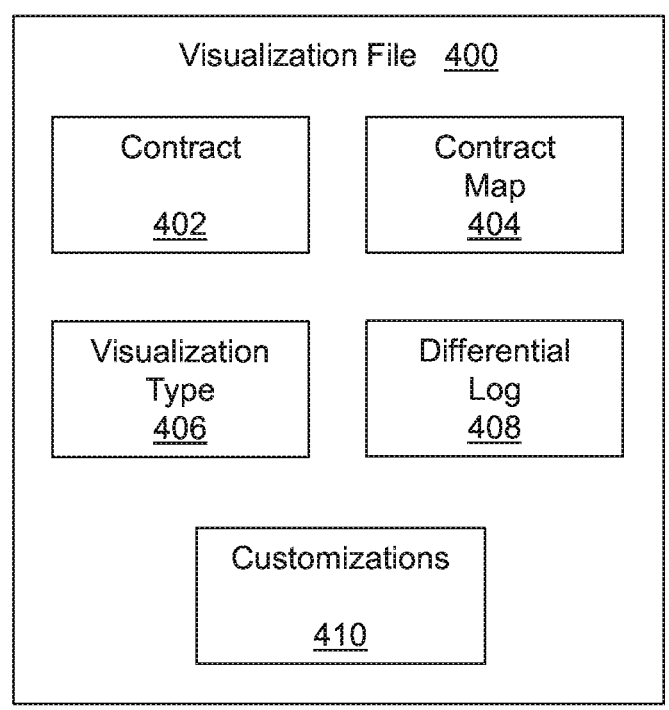
FIG. 4 illustrates an example visualization file from which a visualization may be generated.

FIG. 4 illustrates an example visualization file 400 from which a visualization may be generated, arranged in accordance with at least one embodiment described herein. The visualization file 400 may be stored on a user device and/or on a server device or in other storage location. The visualization file 400 may include a contract 402, a corresponding contract map 404 and/or transform rules, a visualization type 406, a differential log 408, and customizations 410.

The contract 402 may include or correspond to one or more of the contracts described elsewhere herein.

The contract map 404 and/or transform rules may include or correspond to one or more of the contract maps and/or transform rules described elsewhere herein.

The visualization type 406 may include or correspond to one or more of the visualization types described elsewhere herein and/or may include a user's selection of a specific visualization type to apply to a visualization the user desires to generate.

The differential log 408 may include a list of one or more alterations the user has made to the visualization, e.g., to one or more graphical objects, and/or a list of one or more implicated changes to the underlying data of the data source used to generate the visualization.

The customizations 410 may include customizations to a set of one or more graphical objects for each of one or more specific data objects and/or conditional customization that customizes the set of one or more graphical objects for each data object that satisfies a predetermined condition.

The visualization file 400 does not include the underlying source data, e.g., data or data objects from a data source. Thus, when a user "opens" the visualization file 400 to display and view the corresponding visualization or syncs to the data source, the visualization may be regenerated from the source data. As such, changes made to the source data may be reflected in the regenerated visualization without the user having to manually update the visualization.

Figure 5:
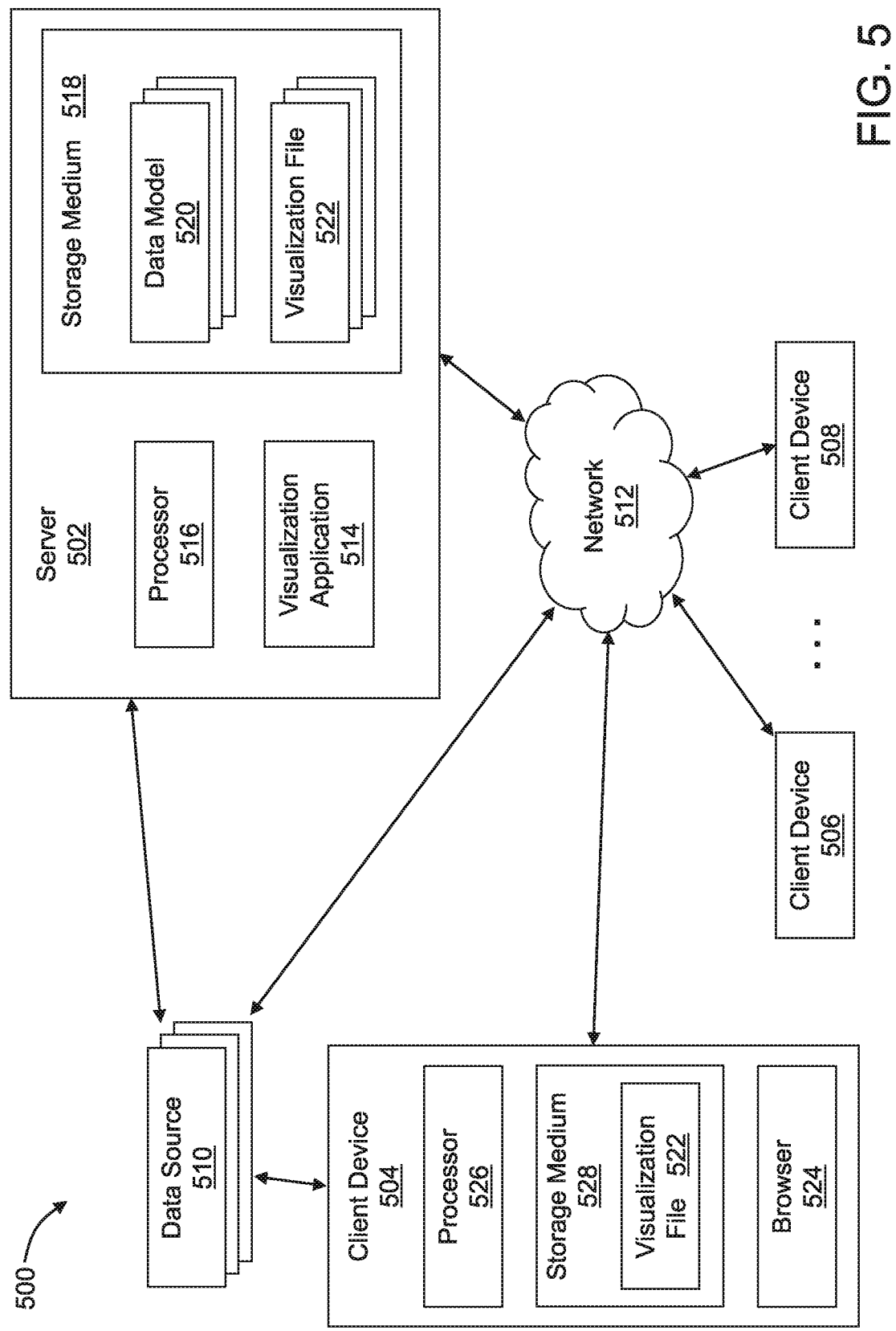
FIG. 5 is a block diagram of an example operating environment in which the architecture of FIG. 1 may be implemented.

FIG. 5 is a block diagram of an example operating environment 500 in which the architecture 100 of FIG. 1 may be implemented, arranged in accordance with at least one embodiment described herein. The operating environment 500 may include a server 502 and one or more client devices 504, 506, 508. The server 502 and/or the client devices 504, 506, 508 may be configured to generate, customize, and/or interact with visualizations of source data from one or more data sources 510 based on contracts. Alternatively or additionally, the source data of the data sources 510 may be updated based on changes to the visualizations. The generation, customization, and/or interaction with visualizations of source data from one or more data sources 510 based on contracts and/or updating of source data may be facilitated by reversible data transforms.

Each of the one or more data sources 510 may include or correspond to the data sources described elsewhere herein.

Although one server 502 and three client devices 504, 506, 508 are illustrated in FIG. 5, the operating environment 500 may more generally include one or more servers 502 and one or more client devices 504, 506, 508. In these and other embodiments, the operating environment 500 may include other servers and/or devices not illustrated in FIG. 5.

The operating environment 500 may additionally include a network 512. In general, the network 512 may include one or more wide area networks (WANs) and/or local area networks (LANs) that enable the server 502, the client devices 504, 506, 508, and the data sources 510 to communicate with each other. In some embodiments, the network 512 may include the Internet, including a global internetwork formed by logical and physical connections between multiple WANs and/or LANs. Alternately or additionally, the network 512 may include one or more cellular radio frequency (RF) networks and/or one or more wired and/or wireless networks such as 802.xx networks, Bluetooth access points, wireless access points, Internet Protocol (IP)-based networks, or other wired and/or wireless networks. The network 512 may also include servers that enable one type of network to interface with another type of network.

In at least one embodiment, the server 502 may host a web-based visualization application ("application 514") that allows the client devices 504, 506, 508 and/or users thereof to generate, customize, and/or interact with visualizations as described herein. In other embodiments, the application 514 may include a non-web-based application but may generally be described herein as a web-based application for simplicity. Alternately or additionally, the server 502 may facilitate updates to the data sources 510 based on changes to the visualizations as described elsewhere herein.

The server 502 may additionally include a processor 516 and a storage medium 518. The processor 516 may be of any type such as a central processing unit (CPU), a microprocessor (µP), a microcontroller (µC), a digital signal processor (DSP), or any combination thereof. The processor 516 may be configured to execute computer instructions that, when executed, cause the processor 516 to perform or control performance of one or more of the operations described herein with respect to the server 502.

The storage medium 518 may include volatile memory such as random access memory (RAM), persistent or non-volatile storage such as read only memory (ROM), electrically erasable and programmable ROM (EEPROM), compact disc-ROM (CD-ROM) or other optical disk storage, magnetic disk storage or other magnetic storage device, NAND flash memory or other solid state storage device, or other persistent or non-volatile computer storage medium. The storage medium 518 may store computer instructions that may be executed by the processor 516 to perform or control performance of one or more of the operations described herein with respect to the server 502.

The storage medium 518 may additionally store one or more data models 520 and/or data collections and/or visualization files 522. The data models 520 and/or data collections may each include or correspond to the data model 108 of FIG. 1, for example. In at least one embodiment, one data model 520 and/or data collection may be generated for each data source 510. In at least one embodiment, one data model 520 and/or data collection may be generated for multiple data sources 510. In at least one embodiment, multiple data models 520 and/or data collections may be generated for a given one of the data sources 510. The generated data model(s) 520 and/or data collections may be persistently stored in the storage medium 518 and/or at least temporarily stored in volatile storage, e.g., in-memory.

The visualization files 522 may each include or correspond to the visualization file 400 of FIG. 4, for example. Each visualization file may generate a corresponding visualization, each visualization being a visualization of at least some data from a corresponding one of the data sources 510, which data from the data sources 502 may be available to the server 502 in a standardized format in the data models 520.

Source data at the data sources 510 may undergo changes over time. As such, the server 502 may from time to time update the data models 520 consistent with updates to the data sources 510. For example, the server 502 may include or be communicatively coupled to one or more ETL modules, such as the ETL modules 110, 112, 114 of FIG. 1 that perform an ETL process on the data sources 510 from time to time to generate and/or update the data models 520 on the server 502.

Alternatively or additionally, the server 502 may track changes made to data objects in a visualization and/or to graphical objects that represent the data objects in the visualization. The changes may be tracked in, e.g., a differential log of each of the visualization files 522, such as the differential log 408 of FIG. 4. A user may then be queried or otherwise prompted about whether to update the source data in view of the changes to the visualization that may implicate changes to the source data.

In some embodiments, the server 502 may be configured to cooperate with the client devices 504, 506, 508 to allow the client devices 504, 506, 508 to generate, customize, and/or interact with visualizations of at least some data of the data sources 510 and/or to update at least some data of the data sources 510 based on alterations to the visualizations. In these and other embodiments, client devices 504, 506, 508 may use a corresponding application or app, such as a browser 524, to generate the visualizations from the visualization files 522, which visualizations may be displayed on a display of the corresponding client device 504, 506, 508.

Accordingly, each of the client devices 504, 506, 508 may execute an application, such as the browser 524, configured to communicate through the network 512 with the server 502. Each of the other client devices 519, 521 may be similarly configured to execute a browser, such as the browser 524. The browser 524 may include an Internet browser or other suitable application for communicating through the network 512 with the server 502. The browser 524 may generate, download and/or interact with visualizations and/or visualization files 522. Each of the client devices 504, 506, 508 may include a desktop computer, a laptop computer, a tablet computer, a mobile phone, a smartphone, a personal digital assistant (PDA), a wearable device (e.g., a smart watch), or another suitable client device.

Each of the client devices 504, 506, 508 may additionally include a processor and a storage medium, such as a processor 526 and a storage medium 528 as illustrated for the client device 504 in FIG. 5. Each of the other client devices 506, 508 may be similarly configured. Similar to the processor 516 of the server 502, the processor 526 may be of any type such as a CPU, a µP, a µC, a DSP, or any combination thereof. The processor 526 may be configured to execute computer instructions that, when executed, cause the processor 526 to perform or control performance of one or more of the operations described herein with respect to the client device 504 and/or the browser 524.

Similar to the storage medium 518 of the server 502, the storage medium 528 of the client device 504 may include volatile memory such as RAM, persistent or non-volatile storage such as ROM, EEPROM, CD-ROM or other optical disk storage, magnetic disk storage or other magnetic storage device, NAND flash memory or other solid state storage device, or other persistent or non-volatile computer storage medium. The storage medium 528 may store computer instructions that may be executed by the processor 526 to perform one or more of the operations described herein with respect to the client device 504 and/or the browser 524. The storage medium 528 may additionally store, at least temporarily, a visualization file 522 and/or other content or data obtained from the server 502 and/or created locally on the client device 504.

Embodiments described herein are not limited to using a browser to communicate with the server 502 to generate, customize, and/or interact with visualizations. For example, rather than or in addition to a browser, the client devices 504, 506, 508 may include a native app as are often used on client devices such as mobile devices including smartphones and tablet computers. Accordingly, embodiments described herein generally include generating, customizing, and/or interacting with visualizations using a browser, a native app, or another suitable application on the client devices 504, 506, 508.

As previously indicated, some embodiments described herein may involve generating one or more intermediate data structures by applying one or more reversible transforms to source data and/or to another intermediate data structure. The transforms may include a field renaming transform as already described above. Alternatively or additionally, the transforms may include a list unrolling transform, a distinct value transform, a join transform, a union transform, a filter transform, and/or other transforms. The output of each transform may include an intermediate data collection and may be referred to as an output intermediate data collection. The input of each transform may include source data such as an original data collection or an intermediate data collection output by another transform and may be referred to as an input data collection.

In these and other embodiments, a method to generate a visualization of data from a data source based on a contract may include receiving input effective to select a visualization type of multiple different visualization types to apply to a visualization of data. The selected visualization type may be associated with the contract. Each of the different visualization types may be associated with a specific contract of multiple contracts. Each corresponding contract may include a corresponding schema that specifies a set of data fields and one or more relationships between the data fields in the set to generate and display a corresponding visualization having a corresponding visualization type. The method may also include mapping at least some data of a data source to the contract such that the contract is satisfied. The method may also include displaying the visualization of the at least some data of the data source based on the contract, the displayed visualization having the selected visualization type. The mapping step or other step(s) of this or other methods may include generating the one or more intermediate data structures, e.g., by applying one or more transforms to the source data.

Each of the following transforms will be described in turn: the field renaming transform, the list unrolling transform, the distinct value transform, the join transform, the union transform, and/or the filter transform. Other transforms may be implemented instead of or in addition to the foregoing transforms.

The field renaming transform may include renaming the field of an input data collection to a different name in an output intermediate data collection. Various examples of the field renaming transform have already been described above with respect to FIG. 3.

Figure 6A:
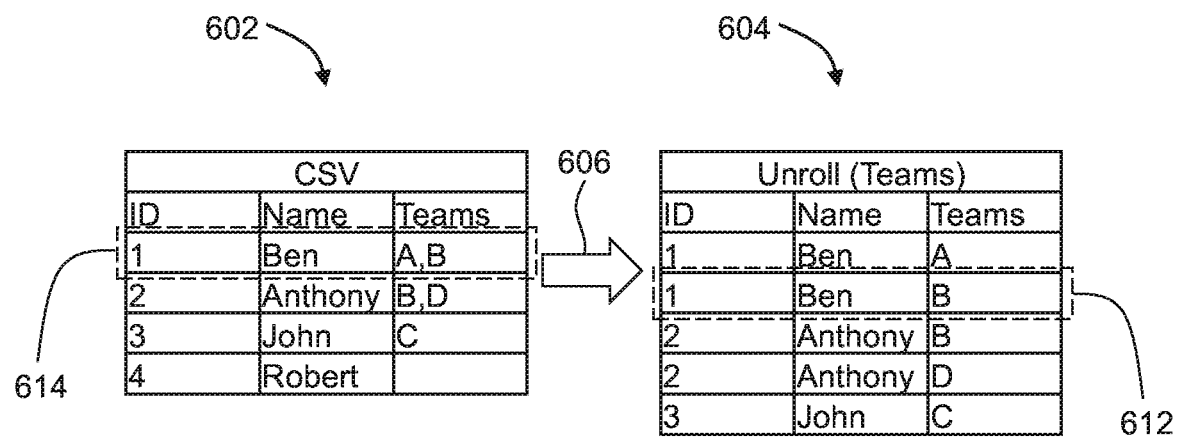
FIG. 6A illustrates an example of a list unrolling transform.

The list unrolling transform may unroll a list of entries that each has a particular field with one or more delimited values in the particular field. Comma-separated values are used herein by way of example, but more generally any delimiter may be configured, e.g., commas, semicolons, quotes, braces, pipes, slashes (forward and/or backward), or other suitable delimiters. FIG. 6A illustrates an example of the list unrolling transform, arranged in accordance with at least one embodiment described herein. The list unrolling transform may be applied to, e.g., an original data collection 602 to generate an intermediate data collection 604, as indicated at 606 (hereinafter the list unrolling transform 606).

In more detail, FIG. 6A includes the original data collection 602, e.g., source data, that includes a comma-separated values list (CSV) with an ID field, a Name field, and a Teams field. The "ID" field includes a unique identifier (ID) for each of various employees of a company. The "Name" field includes a first name for each employee associated with the corresponding ID in the "ID" field. The "Teams" field includes, for each employee associated with the corresponding ID in the "ID" field, a set of one or more values of one or more teams to which each employee is assigned. Where the set of one or more values includes multiple values, the values may be comma-separated.

The intermediate data collection 604 may be generated by applying the list unrolling transform based on the "Teams" field to the original data collection 602 and may be referred to as the unroll (teams) intermediate data collection. It can be seen from FIG. 6A that each employee that has multiple comma-separated values in the "Teams" field is entered multiple times in the unroll (teams) intermediate data collection 604, e.g., one time for each value in the "Teams" field of the original data collection 602. It can also be seen from FIG. 6A that each employee that does not include any values in the "Teams" field (e.g., employee "Robert") does not have an associated record or output in the unroll (teams) intermediate data collection 602.

Figure 6B:
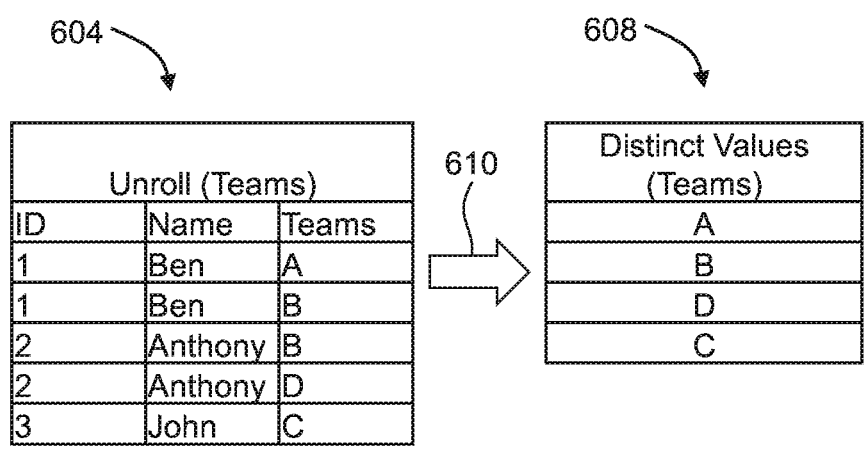
FIG. 6B illustrates an example distinct value transform.

The distinct value transform may generate an intermediate data collection that lists, a single time, each distinct value from a particular field of an input data collection that may potentially include multiple occurrences of one or more distinct values. FIG. 6B illustrates an example distinct value transform, arranged in accordance with at least one embodiment described herein. The distinct value transform may be applied to, e.g., the unroll (teams) intermediate data collection 604 to generate another intermediate data collection 608, as indicated at 610 (hereinafter the distinct value transform 610).

The intermediate data collection 608 may be referred to as the distinct values (teams) intermediate data collection 608. In this example, the distinct values transform 610 is applied on the "Teams" field of the unroll (teams) intermediate data collection 604 which includes five entries in the "Teams" field, but only four distinct values since the value "B" occurs twice. Thus, the distinct values (teams) intermediate data collection 608 has four distinct values in this example.

The join transform may generate an intermediate data collection from two different input data collections. In more detail, the join transform may combine two different input data collections that have at least one common field between them to generate an intermediate data collection that may be referred to as a join intermediate data collection. In the join transform, duplicate fields may be eliminated. For example, the common field may be carried into the join intermediate data collection once, e.g., from one of the input data collections, but not from both of the input data collections. In some embodiments, the join transform may be similar to a foreign key-based join.

The union transform, which may also be referred to as the concatenation transform, may generate an intermediate data collection, which may be referred to as a union intermediate data collection, by combining two input data collections that have the same or substantially the same (e.g., more than 75%) fields. For example, the union intermediate data collection may include all the records from both of the two input data collections.

The filter transform may generate an intermediate data collection, which may be referred to as a filtered intermediate data collection, from an input data collection. The filter transform may carry into the filtered intermediate data collection only those records from the input data collection that satisfy a particular rule or criterion.

Figure 7A:
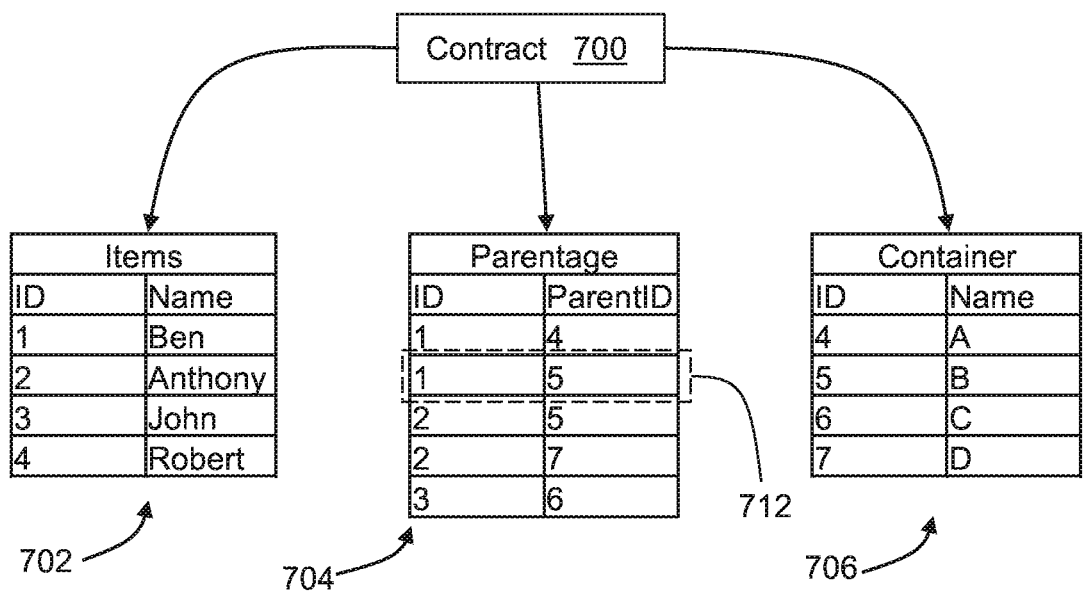
FIG. 7A illustrates an example contract that may be used to generate a container visualization.

FIG. 7A illustrates an example contract 700 that may be used to generate a container visualization, arranged in accordance with at least one embodiment described herein. The contract 700 may expect (e.g., may map to) an Items data collection 702, a Parentage data collection 704, and a container data collection 706. The Items data collection 702 may include an ID field and a Name field, each value in the ID field uniquely identifying an entity (a person in this case) having a first name listed in the Name field. The Parentage data collection 704 may include an ID field and a parent ID field. The ID field in the Parentage data collection 704 may uniquely identify the same entities as in the Items data collection 702. The ParentID field may uniquely identify a container, e.g., corresponding to a team or group, to which the entity uniquely identified in the ID field belongs. Entities that belong to two different containers may have one record for each container to which they belong in the Parentage data collection 704. The Container data collection 706 may include an ID field and a Name field. The ID field in the Container data collection 706 may uniquely identify the same containers as in the ParentID field of the Parentage data collection 704. The Name field in the Container data collection 706 may include a name of each of the containers uniquely identified by the ID field of the Container data collection 706.

Figure 7B:
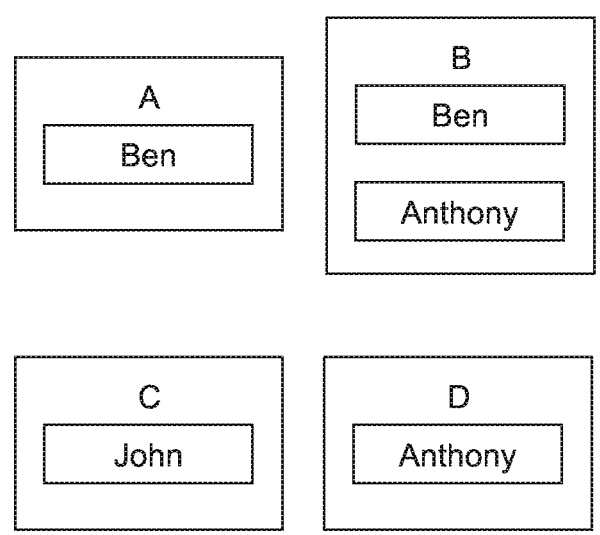
FIG. 7B illustrates an example container visualization that may be generated by the contract of FIG. 7A.

FIG. 7B illustrates an example container visualization 710 that may be generated by the contract 700 of FIG. 7A, arranged in accordance with at least one embodiment described herein. As previously mentioned, the contract 700 of FIG. 7A may expect three data collections such as the Items data collection 702, the Parentage data collection 704, and the Container data collection 706 to generate the container visualization 710. In practice, however, the source data may be in a different format, such as in the format of a CSV such as the original data collection 602 of FIG. 6A. Accordingly, embodiments described herein may apply one or more transforms to reversibly transform an original data collection 602 to a suitable format to satisfy a contract to generate a visualization. For example, the unroll (teams) intermediate data collection 604 of FIGS. 6A and 6B generated by applying the list unrolling transform 606 to the original data collection 602 may include the same information as the data collections 702, 704, and 706 of FIG. 7A while also being in a suitable format to satisfy the contract 700 to generate the container visualization 710 of FIG. 7B.

Now suppose that a user makes a change to the container visualization 710 that the user would like to have propagated back into the original data collection 602 of FIG. 6A. In particular, suppose the user deletes the item "Ben" from container B in the container visualization 710 of FIG. 7B and the user would like the source data updated to reflect that the entity named "Ben" is no longer a member of the team or group of container B. Logically, this change amounts to deleting a record 712 from the Parentage data collection 704 of FIG. 7A. However, since the source data is not in the form of the data collections 702, 704, and 706, one or more transforms may be used instead.

Instead, and referring to FIG. 6A, deleting the item "Ben" from the container B in the container visualization 710 could be achieved by deleting a record 612 from the unroll (teams) intermediate data collection 604. Since the unroll (teams) intermediate data collection 604 was generated by a reversible transform, e.g., the list unrolling transform 606, the transform rule can be followed backward to identify how the record 612 was generated and where it came from. In particular, it may be determined that the record 612 was generated by unrolling the teams of a record 614 in the original data collection 602 and that the record 612 was generated based on the presence of the second value "B" and the comma preceding it in the Teams field of the record 614. Thus, the second value "B" and the comma preceding it may be removed from the Teams field of the record 614 to revise the original data collection 602 at the source.

The foregoing will be discussed in additional detail with respect to FIG. 8A, which illustrates another example of the list unrolling transform 606 of FIG. 6A after a data source revision, and with respect to FIG. 8B, which illustrates another example of the container visualization of FIG. 7B after the data source revision of FIG. 8A, each arranged in accordance with at least one embodiment described herein.

Figure 8A:
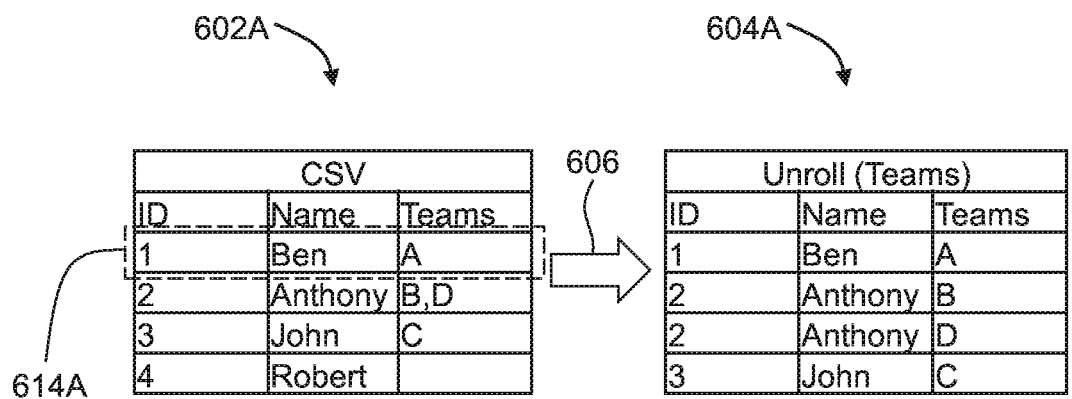
FIG. 8A illustrates another example of the list unrolling transform of FIG. 6A after a data source revision.
Figure 8B:
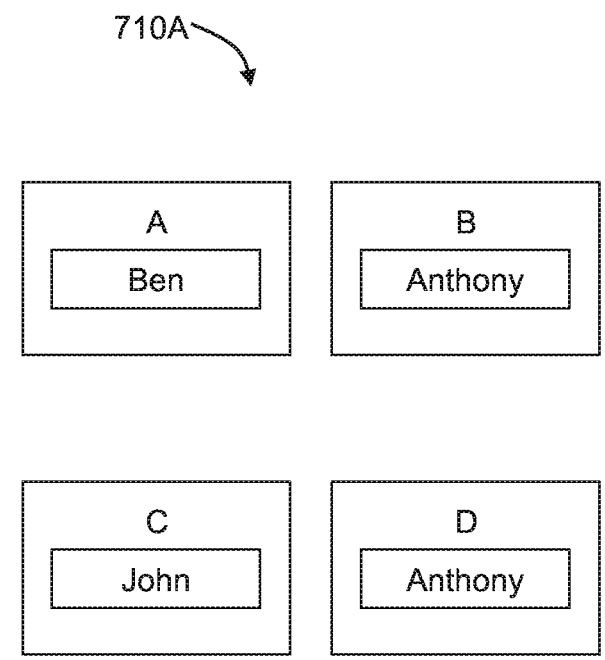
FIG. 8B illustrates another example of the container visualization of FIG. 7B after the data source revision of FIG. 8A.

In more detail, and referring to FIGS. 6A and 8A, the second value "B" and the comma preceding it in the record 614 of the original data collection 602 of FIG. 6A are deleted, resulting in a revised original data collection 602A with a revised record 614A in FIG. 8A. The list unrolling transform 606 may then be applied to the revised original data collection 602A to generate a revised unroll (teams) intermediate data collection 604A in which the record 612 of FIG. 6A is deleted, as illustrated in FIG. 8A. The contract 700 of FIG. 7A may then remap to the revised unroll (teams) intermediate data collection 604A of FIG. 8A to generate an updated container visualization 710A as illustrated in FIG. 8B in which "Ben" is no longer a member of Container B.

Accordingly, some embodiments described herein do not edit the original source data to obtain data in a suitable format to generate visualizations, while permitting the original source data to be edited to reflect changes made to the visualizations, if desired. The foregoing may be enabled through the use of reversible data transforms as described herein.

Figure 9A:
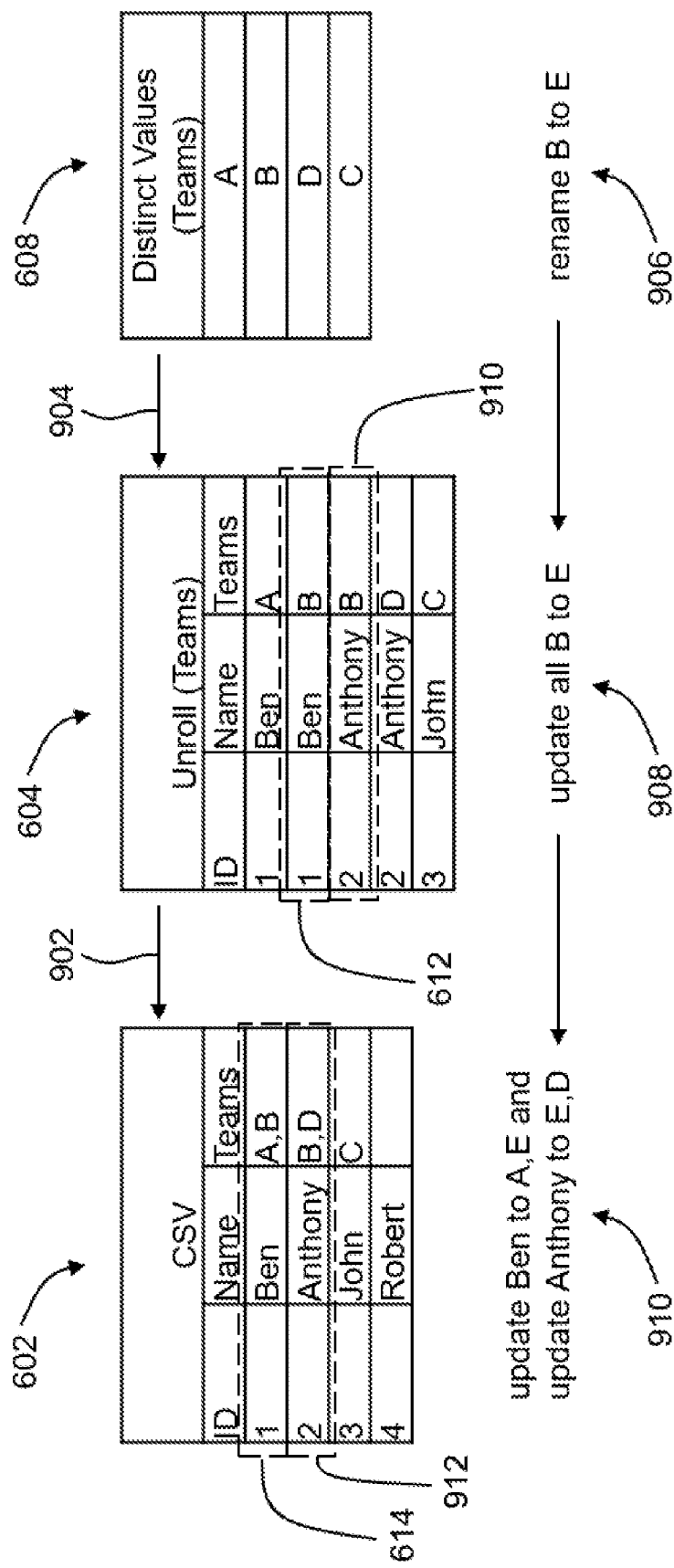
FIG. 9A illustrates a data collection, an unroll (teams) intermediate data collection, and a distinct values (teams) intermediate data collection of FIGS. 6A and 6B and mappings between these data collections.

As another example, reference is now made to FIG. 9A, which illustrates the original data collection 602, the unroll (teams) intermediate data collection 604, the distinct values (teams) intermediate data collection 608 of FIGS. 6A and 6B, and mappings 902, 904 between these data collections, arranged in accordance with at least one embodiment described herein. In this example, suppose the user wants to rename container B as container E and the user would like the source data updated to reflect that the container or team or group B is now named E.

Renaming the container B as container E involves a command 906 to rename value B to value E in the distinct values (teams) intermediate data collection 608. Since the distinct values (teams) intermediate data collection 608 was generated by a reversible transform, e.g., the distinct values transform 610 of FIG. 6B, the corresponding transform rule can be followed backward to identify how the value B was generated and where it came from. In particular, it may be determined that the value B was generated by compiling a list of unique values from the Teams field of the unroll (teams) intermediate data collection 604 and that the value B was the team assignment for both Ben and Anthony in records 612 and 910.

Thus, a command 908 to update all B to E in the Teams field of the unroll (teams) intermediate data collection 604 may also be involved in renaming the container B as container E. Since the unroll (teams) intermediate data collection 604 was generated by a reversible transform, e.g., the list unrolling transform 606 of FIG. 6A, the corresponding transform rule can be followed backward to identify how records 612 and 910 were generated and where they came from. This is already explained above for the record 612. E.g., it may be determined that the record 612 was generated by unrolling the teams of the record 614 in the original data collection 602 and that the record 612 was generated based on the presence of the second value "B" and the comma preceding it in the Teams field of the record 614. Similarly, it may be determined that the record 910 was generated by unrolling the teams of a record 912 in the original data collection 602 and that the record 910 was generated based on the presence of the second value "B" in the Teams field of the record 912. Thus, the second value "B" may be updated to "E" in each of the records 614 and 912 to revise the original data collection 602 at the source.

The foregoing will be discussed in additional detail with respect to FIG. 9B, which illustrates a revised original data collection 602B, a revised unroll (teams) intermediate data collection 604B, and a revised distinct values (teams) intermediate data collection after the data source revisions discussed with respect to FIG. 9A, arranged in accordance with at least one embodiment described herein. The foregoing will also be discussed in additional detail with respect to FIG. 9C, which illustrates another example of the container visualization of FIG. 7B after the data source revision discussed with respect to FIG. 9A, arranged in accordance with at least one embodiment described herein.

Figure 9B:
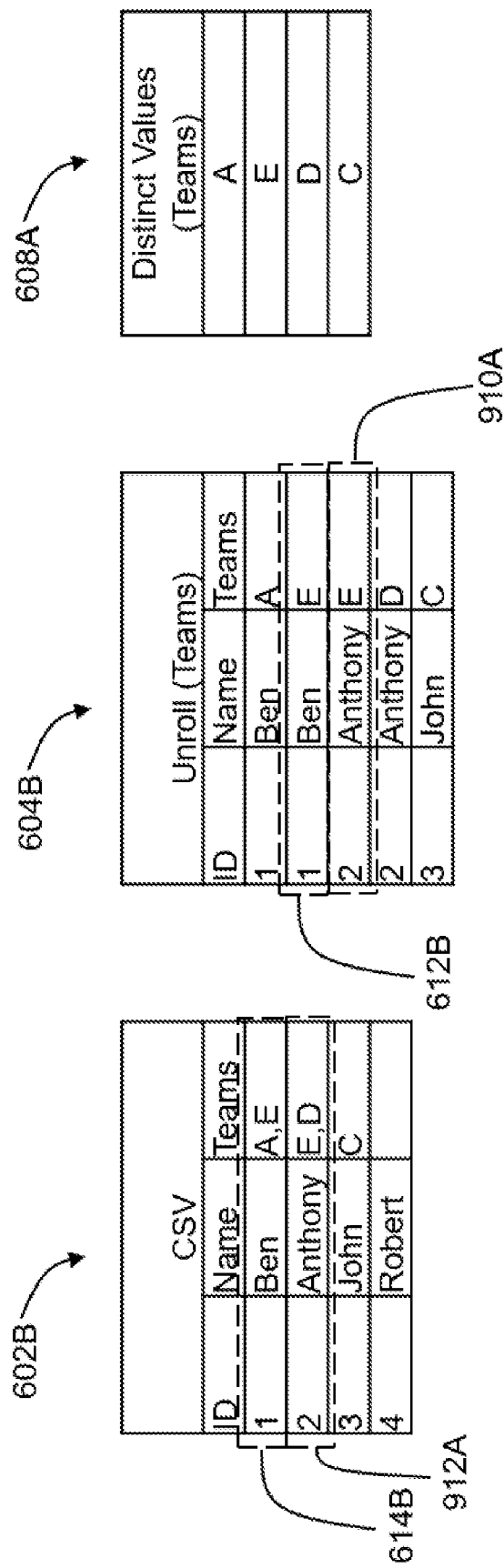
FIG. 9B illustrates a revised original data collection, a revised unroll (teams) intermediate data collection, and a revised distinct values (teams) intermediate data collection after data source revisions discussed with respect to FIG. 9A.
Figure 9C:
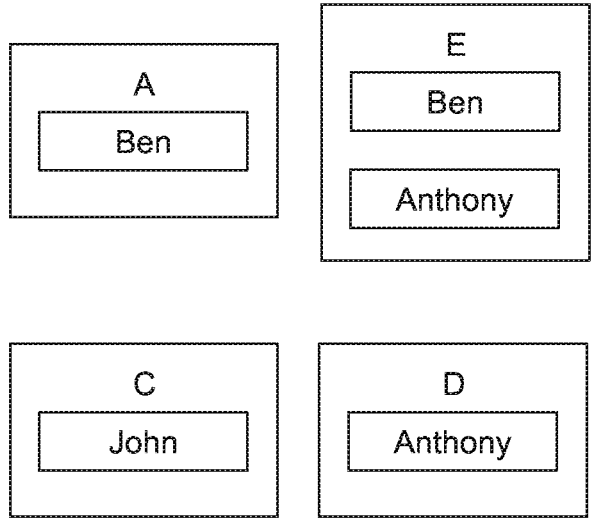
FIG. 9C illustrates another example of the container visualization of FIG. 7B after the data source revision discussed with respect to FIG. 9A.

In more detail, and referring to FIGS. 9A and 9B, the second value "B" in the record 614 and the record 912 of the original data collection 602 are updated to "E", resulting in a revised original data collection 602B with revised records 614B and 912A. The list unrolling transform 606 may then be applied to the revised original data collection 602B of FIG. 9B to generate a revised unroll (teams) intermediate data collection 604B in which records 612 and 910 (of FIG. 9A) are updated to have the value E instead of the value B in the Teams field, resulting in revised records 612B and 910A in FIG. 9B. The distinct values transform 610 may then be applied to the revised unroll (teams) intermediate data collection 604B to generate a revised distinct values (teams) intermediate data collection 608A in which the value B has been updated to the value E as illustrated in FIG. 9B. The contract 700 (of FIG. 7) may then remap to the revised unroll (teams) intermediate data collection 604B and/or the revised distinct values (teams) intermediate data collection 608A of FIG. 9B to generate an updated container visualization 710B as illustrated in FIG. 9C in which container B is renamed as container E.

Figure 10:
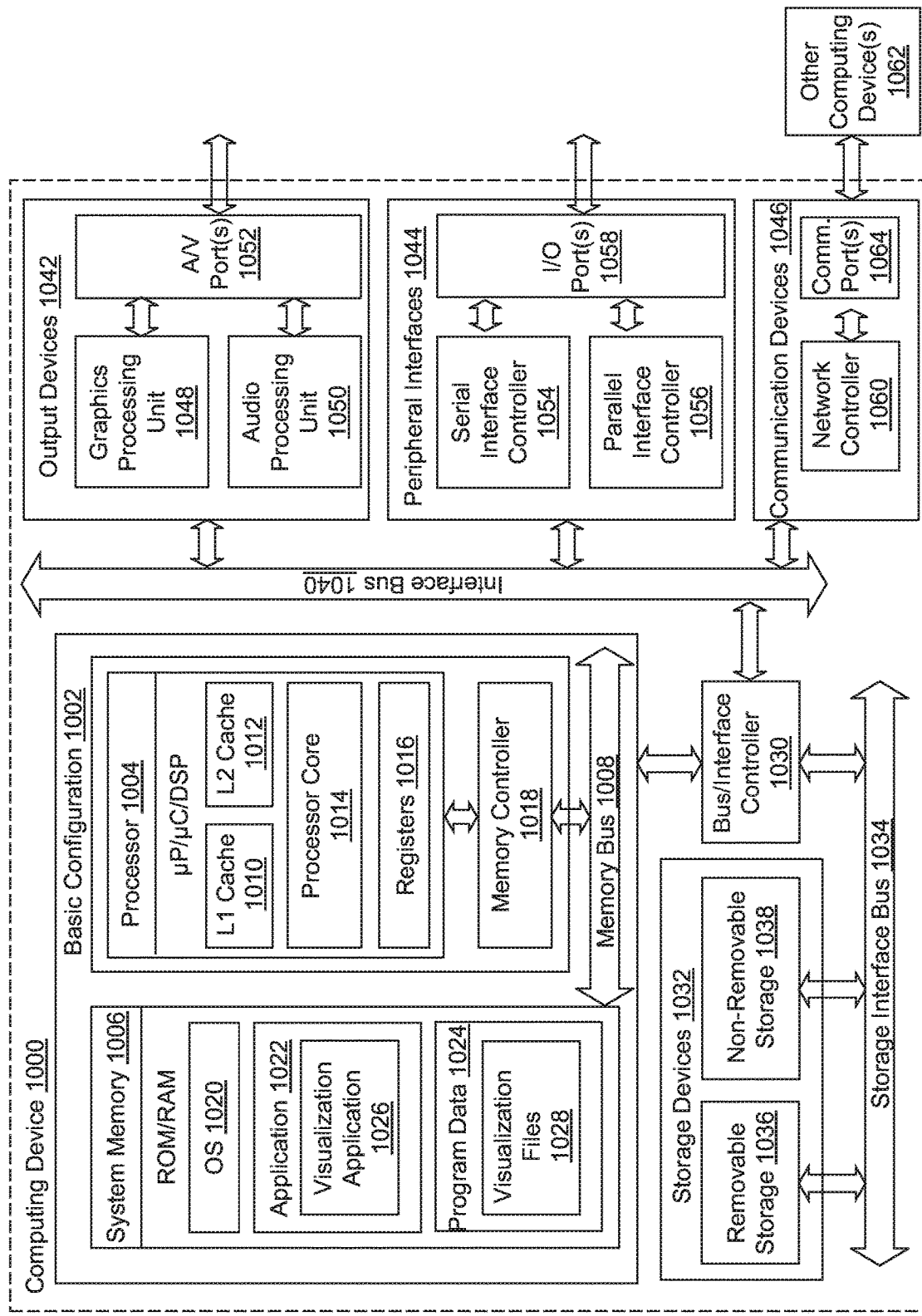
FIG. 10 is a block diagram illustrating an example computing device that is arranged for generating, customizing, and/or interacting with visualizations, all arranged in accordance with at least one embodiment described herein.

FIG. 10 is a block diagram illustrating an example computing device 1000 that is arranged for generating, customizing, and/or interacting with visualizations, arranged in accordance with at least one embodiment described herein. In a basic configuration 1002, the computing device 1000 typically includes one or more processors 1004 and a system memory 1006. A memory bus 1008 may be used to communicate between the processor 1004 and the system memory 1006.

Depending on the desired configuration, the processor 1004 may be of any type including, but not limited to, a microprocessor (µP), a microcontroller (µC), a digital signal processor (DSP), or any combination thereof. The processor 1004 may include one or more levels of caching, such as a level one cache 1010 and a level two cache 1012, a processor core 1014, and registers 1016. The processor core 1014 may include an arithmetic logic unit (ALU), a floating point unit (FPU), a digital signal processing core (DSP Core), or any combination thereof. An example memory controller 1018 may also be used with the processor 1004, or in some implementations the memory controller 1018 may include an internal part of the processor 1004.

Depending on the desired configuration, the system memory 1006 may be of any type including volatile memory (such as RAM), nonvolatile memory (such as ROM, flash memory, etc.), or any combination thereof. The system memory 1006 may include an operating system 1020, one or more applications 1022, and program data 1024. The application 1022 may include a visualization application 1026 that is arranged to generate, customize, and/or interact with visualizations, as described herein. The program data 1024 may include visualization files 1028 (which may include or correspond to the visualization file 400 of FIG. 4) as is described herein, data collections (intermediate and/or original), and/or other visualization application data. In some embodiments, the application 1022 may be arranged to operate with the program data 1024 on the operating system 1020 such that one or more methods may be provided as described herein.

The computing device 1000 may have additional features or functionality, and additional interfaces to facilitate communications between the basic configuration 1002 and any involved devices and interfaces. For example, a bus/interface controller 1030 may be used to facilitate communications between the basic configuration 1002 and one or more data storage devices 1032 via a storage interface bus 1034. The data storage devices 1032 may be removable storage devices 1036, non-removable storage devices 1038, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 1006, the removable storage devices 1036, and the non-removable storage devices 1038 are examples of computer storage media or non-transitory computer-readable media. Computer storage media or non-transitory computer-readable media includes RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other non-transitory medium which may be used to store the desired information and which may be accessed by the computing device 1000. Any such computer storage media or non-transitory computer-readable media may be part of the computing device 1000.

The computing device 1000 may also include an interface bus 1040 to facilitate communication from various interface devices (e.g., output devices 1042, peripheral interfaces 1044, and communication devices 1046) to the basic configuration 1002 via the bus/interface controller 1030. The output devices 1042 include a graphics processing unit 1048 and an audio processing unit 1050, which may be configured to communicate to various external devices such as a display or speakers via one or more A/V ports 1052. Diagrams, flowcharts, organizational charts, connectors, and/or other graphical objects generated by the diagram application 1026 may be output through the graphics processing unit 1048 to such a display. The peripheral interfaces 1044 include a serial interface controller 1054 or a parallel interface controller 1056, which may be configured to communicate with external devices such as input devices (e.g., keyboard, mouse, pen, voice input device, touch input device, etc.), sensors, or other peripheral devices (e.g., printer, scanner, etc.) via one or more I/O ports 1058. Such input devices may be operated by a user to provide input to the diagram application 1026, which input may be effective to, e.g., generate curved connectors, designate points as designated points of one or more curved connectors, relocate one or more designated points, and/or to accomplish other operations within the diagram application 1026. The communication devices 1046 include a network controller 1060, which may be arranged to facilitate communications with one or more other computing devices 1062 over a network communication link via one or more communication ports 1064.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 1000 may be implemented as a portion of a small-form factor portable (or mobile) electronic device such as a smartphone, a personal data assistant (PDA) or an application-specific device. The computing device 1000 may also be implemented as a personal computer including tablet computer, laptop computer, and/or non-laptop computer configurations, or a server computer including both rack-mounted server computer and blade server computer configurations.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

One skilled in the art will appreciate that, for this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory computer-readable storage medium having computer-executable instructions stored thereon that are executable by a processor device to perform or control performance of operations comprising:
    mapping at least some data of a data source to a contract such that the contract is satisfied, including:
        applying a first reversible transform to at least some of the data of the data source to generate a first intermediate data structure without modifying the at least some of the data of the data source; and
        applying a second reversible transform to the first intermediate data structure to generate a second intermediate data structure without modifying the at least some of the data of the data source, wherein at least one of the first intermediate data structure or the second intermediate data structure is in a format suitable to satisfy the contract; and
    displaying a visualization of the at least some data of the data source based on the contract, the displayed visualization having a visualization type specified by the contract.

2. The non-transitory computer-readable storage medium of claim 1, wherein applying each of the first and second reversible transforms comprises applying at least one of: a field renaming transform, a list unrolling transform, a distinct value transform, a join transform, a union transform, or a filter transform.

3. The non-transitory computer-readable storage medium of claim 1, the operations further comprising:
    receiving user input to revise a graphical object in the visualization;
    following a transform rule of each of the first and second reversible transforms backward to identify particular data of the data source to revise to effect the revision to the graphical object;
    revising the particular data of the data source to effect the revision to the graphical object;
    remapping the at least some data of the data source that includes the revised particular data to the contract such that the contract is satisfied; and
    redisplaying the visualization of the at least some data of the data source based on the contract, the redisplayed visualization having the revised graphical object.

4. The non-transitory computer-readable storage medium of claim 3, wherein:
    the displayed visualization comprises a container visualization that includes a plurality of items organized in a plurality of containers;
    the user input comprises removal of a particular item of the plurality of items from a particular container of the plurality of containers; and
    revising the particular data of the data source to effect the revision to the graphical object comprises removing a value assigned to the particular container from a record of the particular item that is included in an original data collection of the data source.

5. The non-transitory computer-readable storage medium of claim 3, wherein:
    the displayed visualization comprises a container visualization that includes a plurality of items organized in a plurality of containers;
    the user input comprises renaming a particular container of the plurality of containers from a first container name to a second container name;
    the particular container includes one or more of the plurality of items; and
    revising the particular data of the data source to effect the revision to the graphical object comprises changing a value assigned to the particular container from the first container name to the second container name in each of one or more records of the one or more of the plurality of items, the one or more records included in an original data collection of the data source.

6. The non-transitory computer-readable storage medium of claim 3, wherein following the transform rule of each of the first and second reversible transforms backward to identify the particular data of the data source to revise to effect the revision to the graphical object comprises following the transform rule of each of the first and second reversible transforms backward to identify how one or more values of the graphical object are generated and where the one or more values come from in the data source.

7. A method to generate a visualization of data from a data source based on a contract, the method comprising:
    applying a first reversible transform to data of a data source to generate a first intermediate data structure without modifying the data of the data source;
    applying a second reversible transform to the first intermediate data structure to generate a second intermediate data structure without modifying the data of the data source, wherein at least one of the first intermediate data structure or the second intermediate data structure is in a format suitable to satisfy a contract; and
    displaying a visualization of the data of the data source based on the contract satisfied by one or both of the first intermediate data structure or the second intermediate data structure, the displayed visualization having a visualization type specified by the contract.

8. The method of claim 7, wherein applying each of the first and second reversible transforms comprises applying at least one of: a field renaming transform, a list unrolling transform, a distinct value transform, a join transform, a union transform, or a filter transform.

9. The method of claim 7, further comprising:
receiving user input to revise a graphical object in the visualization;
following a transform rule of each of the first and second reversible transforms backward to identify particular data of the data source to revise to effect the revision to the graphical object;
revising the particular data of the data source to effect the revision to the graphical object;
applying the first reversible transform to the revised data of the data source to generate a revised first intermediate data structure;
applying the second reversible transform to the revised first intermediate data structure to generate a revised second intermediate data structure, wherein at least one of the revised first intermediate data structure or the revised second intermediate data structure is in a format suitable to satisfy the contract; and
redisplaying the visualization of the at least some data of the data source based on the contract satisfied by one or both of the revised first intermediate data structure or the revised second intermediate data structure, the redisplayed visualization having the revised graphical object.

10. The method of claim 9, wherein:
the displayed visualization comprises a container visualization that includes a plurality of items organized in a plurality of containers;
the user input comprises removal of a particular item of the plurality of items from a particular container of the plurality of containers; and
revising the particular data of the data source to effect the revision to the graphical object comprises removing a value assigned to the particular container from a record of the particular item that is included in an original data collection of the data source.

11. The method of claim 9, wherein:
the displayed visualization comprises a container visualization that includes a plurality of items organized in a plurality of containers;
the user input comprises renaming a particular container of the plurality of containers from a first container name to a second container name;
the particular container includes one or more of the plurality of items; and
revising the particular data of the data source to effect the revision to the graphical object comprises changing a value assigned to the particular container from the first container name to the second container name in each of one or more records of the one or more of the plurality of items, the one or more records included in an original data collection of the data source.

12. The method of claim 9, wherein following the transform rule of each of the first and second reversible transforms backward to identify the particular data of the data source to revise to effect the revision to the graphical object comprises following the transform rule of each of the first and second reversible transforms backward to identify how one or more values of the graphical object are generated and where the one or more values come from in the data source.

13. A non-transitory computer-readable storage medium having computer-executable instructions stored thereon that are executable by a processor device to perform or control performance of operations comprising:
applying a first reversible transform to data of a data source to generate a first intermediate data structure without modifying the data of the data source;
applying a second reversible transform to the first intermediate data structure to generate a second intermediate data structure without modifying the data of the data source, wherein at least one of the first intermediate data structure or the second intermediate data structure is in a format suitable to satisfy a contract; and
displaying a visualization of the data of the data source based on the contract satisfied by one or both of the first intermediate data structure or the second intermediate data structure, the displayed visualization having a visualization type specified by the contract.

14. The non-transitory computer-readable storage medium of 13, wherein applying each of the first and second reversible transforms comprises applying at least one of: a field renaming transform, a list unrolling transform, a distinct value transform, a join transform, a union transform, or a filter transform.

15. The non-transitory computer-readable storage medium of claim 13, the operations further comprising:
receiving user input to revise a graphical object in the visualization;
following a transform rule of each of the first and second reversible transforms backward to identify particular data of the data source to revise to effect the revision to the graphical object;
revising the particular data of the data source to effect the revision to the graphical object;
applying the first reversible transform to the revised data of the data source to generate a revised first intermediate data structure;
applying the second reversible transform to the revised first intermediate data structure to generate a revised second intermediate data structure, wherein at least one of the revised first intermediate data structure or the revised second intermediate data structure is in a format suitable to satisfy the contract; and
redisplaying the visualization of the at least some data of the data source based on the contract satisfied by one or both of the revised first intermediate data structure or the revised second intermediate data structure, the redisplayed visualization having the revised graphical object.

16. The non-transitory computer-readable storage medium of claim 15, wherein:
the displayed visualization comprises a container visualization that includes a plurality of items organized in a plurality of containers;
the user input comprises removal of a particular item of the plurality of items from a particular container of the plurality of containers; and
revising the particular data of the data source to effect the revision to the graphical object comprises removing a value assigned to the particular container from a record of the particular item that is included in an original data collection of the data source.

17. The non-transitory computer-readable storage medium of claim 15, wherein:
the displayed visualization comprises a container visualization that includes a plurality of items organized in a plurality of containers;
the user input comprises renaming a particular container of the plurality of containers from a first container name to a second container name;
the particular container includes one or more of the plurality of items; and
revising the particular data of the data source to effect the revision to the graphical object comprises changing a value assigned to the particular container from the first container name to the second container name in each of one or more records of the one or more of the plurality of items, the one or more records included in an original data collection of the data source.

18. The non-transitory computer-readable storage medium of claim 15, wherein following the transform rule of each of the first and second reversible transforms backward to identify the particular data of the data source to revise to effect the revision to the graphical object comprises following the transform rule of each of the first and second reversible transforms backward to identify how one or more values of the graphical object are generated and where the one or more values come from in the data source.

* * * * *